(12) United States Patent
Sanghavi et al.

(10) Patent No.: US 10,713,315 B2
(45) Date of Patent: Jul. 14, 2020

(54) PERSONALIZED TARGETING OF MEDIA STATIONS

(71) Applicant: Apple Inc., Cupertino, CA (US)

(72) Inventors: Mehul K. Sanghavi, Sunnyvale, CA (US); Michael Froimowitz Greenzeiger, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 15/268,394

(22) Filed: Sep. 16, 2016

(65) Prior Publication Data

US 2017/0004215 A1    Jan. 5, 2017

Related U.S. Application Data

(63) Continuation of application No. 14/187,179, filed on Feb. 21, 2014, now Pat. No. 9,471,688.

(51) Int. Cl.
*G06F 16/9535* (2019.01)
*G06F 16/435* (2019.01)
*G06F 16/2457* (2019.01)

(52) U.S. Cl.
CPC .... *G06F 16/9535* (2019.01); *G06F 16/24578* (2019.01); *G06F 16/435* (2019.01)

(58) Field of Classification Search
CPC ......... G06F 17/30867; G06F 17/30029; G06F 17/3053; G06F 16/9535; G06F 16/435; G06F 16/24578
See application file for complete search history.

(56) References Cited

U.S. PATENT DOCUMENTS

| | | | |
|---|---|---|---|
| 7,356,556 B2 | 4/2008 | Brydon et al. | |
| 7,793,823 B2 | 9/2010 | Klein, Jr. et al. | |
| 8,225,206 B2 | 7/2012 | Faenger et al. | |
| 8,549,402 B2 | 10/2013 | Moore et al. | |
| 8,677,416 B2* | 3/2014 | Arora | H04H 60/65 725/37 |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2008/0016624 A1* | 1/2008 | Osborn | A63H 33/006 5/658 |
| 2010/0332329 A1* | 12/2010 | Roberts | G06Q 30/0269 705/14.66 |
| 2011/0078323 A1 | 3/2011 | Wooden | |

(Continued)

OTHER PUBLICATIONS

"Pandora Adds Genre-Based Stations", by Tech, https://www.popsugartech.com/Pandora-Introduces-Genres-10520904, Aug. 25, 2010. (Year: 2010).*

(Continued)

*Primary Examiner* — Jay A Morrison
(74) *Attorney, Agent, or Firm* — Polsinelli PC

(57) ABSTRACT

Methods and arrangements are provided for the personalized targeting and customization of media stations in an online media service. A key set of inputs, with values unique to each user, is used to arrive at a personalized group of featured media stations that a user has access to. Demographic data, media preferences, user actions detected through the user's input, and other criteria allow for the content and screen time of featured stations to be personalized for each user.

21 Claims, 7 Drawing Sheets

(56) References Cited

U.S. PATENT DOCUMENTS

| | | | |
|---|---|---|---|
| 2012/0159526 A1* | 6/2012 | Rao | G06Q 30/02 |
| | | | 725/5 |
| 2012/0179693 A1 | 7/2012 | Knight et al. | |
| 2012/0317161 A1* | 12/2012 | Bai | G06F 17/30029 |
| | | | 709/201 |
| 2013/0031177 A1 | 1/2013 | Willis et al. | |
| 2013/0191226 A1 | 7/2013 | Smallwood et al. | |
| 2014/0074846 A1* | 3/2014 | Moss | G06F 17/30761 |
| | | | 707/740 |
| 2014/0195351 A1 | 7/2014 | Lasch et al. | |

OTHER PUBLICATIONS

Zaharchuk et al., "A new recommender system for the interactive radio network FMhost," International Workshop on Experimental Economics in Machine Learning, 2012. (Year: 2012).*

* cited by examiner

PERSONALIZED TARGETING OF MEDIA STATIONS

CROSS REFERENCE TO RELATED APPLICATIONS

This application is a continuation of, and claims the benefit of priority to, U.S. application Ser. No. 14/187,179, filed on Feb. 21, 2014, which is expressly incorporated by reference herein in its entirety.

TECHNICAL FIELD

The present technology pertains to the personalized targeting and display of media stations and media content for users according to user media preferences and user interactions with a client device.

BACKGROUND

Online media services, such as online radio or music streaming services, appeal to end users due to their ease of access, portability across a wide variety of devices, capacity for media discovery, and the massive scale of media libraries which are available for user selection and consumption.

While the large volume of available media content in such services implies nearly endless choice, it also challenges editorial teams to make careful decisions regarding which media content to feature prominently on users' screens. Some devices may only allow for a small amount of screen real estate with which to capture the user's attention. In addition, users may be overwhelmed by the large amount of choices available to them. Rather than searching for media content aligned with their tastes, users may prefer to be provided with media stations and other curated or pre-selected content to suit their media preferences.

The online media stations that feature prominently in an online media service have a major impact on which media items are played, and ultimately, how positive a user's experience with the service is. No two users have identical content preferences, so an individualized solution that takes into account each user's preferences is ideal for optimally meeting the needs of all users.

SUMMARY

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology provides approaches that can be used to target media stations in an online media service toward each individual user, based on user media preferences. In these approaches, user media preferences can be gauged by monitoring the device user's interactions with the device and keeping track of the time and the types of interactions to determine the receptiveness of the device user. Media preferences may also be gauged by acquiring demographic and other information about the user. Once user media preferences are determined, stations can be weighted and chosen to be displayed for that user for a given amount of time based on the user preferences. Disclosed are systems, methods, and non-transitory computer-readable storage media for implementing the approaches of the present technology.

One aspect of the present technology involves determining how media stations are displayed within a navigation scheme in an online media service. In accordance with the present technology, users can be provided a featured stations navigation scheme displayed prominently in a user interface of the media service. The navigation scheme can have a number of slots, with each slot containing a bank of stations to be optimally chosen and displayed within the limited screen space. Each bank can contain a sorted queue of ranked stations, where each station is ranked by a series of targeting definitions and rules.

In the present technology, stations may be ranked editorially or algorithmically and can be based on a number of factors. For example, information about the user can be retrieved from a user profile, and can be factored into a ranking, such as the user's demographic and geographic information and information about specific media preferences, such as a user's preferred music genres. Alternatively, the station rankings can be based on user interactions that are further defined as either positive or negative interactions. A positive interaction type with respect to a station would result in a higher ranking for that station. The present technology can also detect the lack of a user interaction, which itself is viewed as a user interaction. These user interactions can be associated with media playback within the media service.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an efficient means to present and suggest media content to users of a media service based on users' media preferences and device interaction. The disclosed technology provides for users to be presented with media and content suited to their individualized tastes, in lieu of or in addition to content that is curated for a wide range of users. The disclosed technology also provides advertisers and third-party content distributors with the ability to target invitational content, advertisements and media to users according to specific demographic and geographic areas, as well as the preferences of those users based on interaction with the service.

In particular, the present technology is directed to systems, methods, devices, and non-transitory computer-readable storage media providing for the presentation and suggestion of media content based on user interaction and media preferences.

Prior to discussing the present technology in detail, a brief introductory description of an exemplary configuration of devices and a network is disclosed herein. A detailed description of the various aspects of the present technology will then follow. These variations shall be described herein as the various embodiments are set forth.

Figure 1:
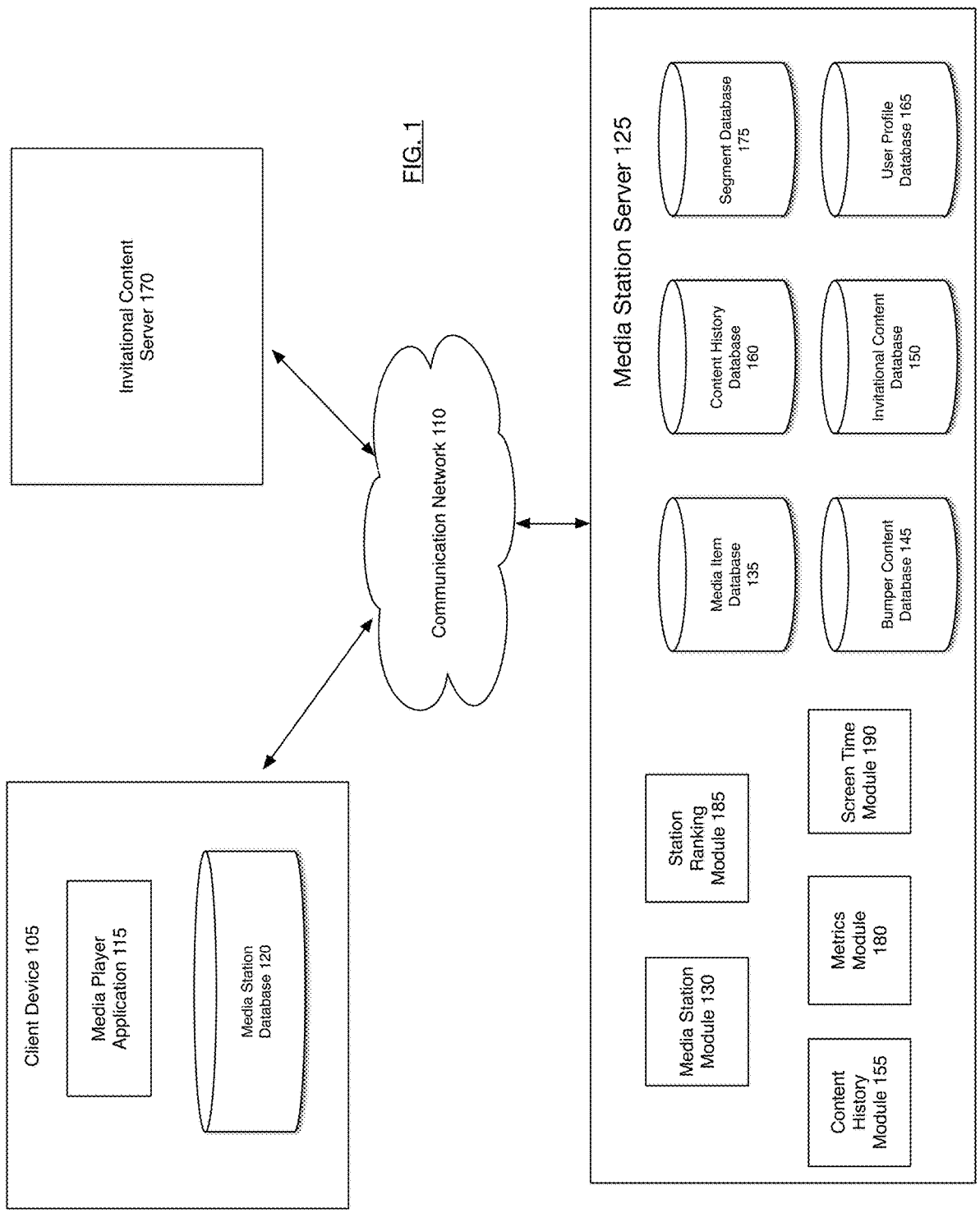
FIG. 1 illustrates an exemplary configuration of devices and a network.

FIG. 1 illustrates an exemplary system configuration 100 in which multiple computing devices can be configured to communicate with each other to create and perform a media station on a client device.

In the present technology, a media station can be a sequence of media items that can be played or executed by a media station player application on a client device. Some non-limiting examples of media items can include songs, podcasts, television shows, movies, games, audiobooks, educational courses, and/or video. Other media items are also possible. A media station player can be any application capable of media item playback, such as a component of a webpage, a plug-in, a client-side application, etc.

In some embodiments, a media station can be a continuous sequence of media items such that as one media item completes playback a next media item begins. The playback process of a continuous media item stream can repeat until a user takes an action to terminate or temporarily delay the playback, such as quitting the media player application, switching to a different media station, pausing playback, or skipping a media item. However, a media station can also be defined to be a finite sequence of media items. A media station can be homogeneous or heterogeneous. That is, a media station can be designed to playback media items all of the same media type or of different media types. For example, a homogeneous media station can playback only audio media items or only video media items. In another example, a heterogeneous media station can playback a mix of audio media items and video media items. In some embodiments, the various media items can be presented concurrently such that presentation of one media item overlaps with presentation with a different media item.

A media station can also be configured to play or present invitational content, such as advertisements, within the media stream. An invitational content item can include content found in a media item, such as a song or a video, but an invitational content item can also include targeted content and/or content designed to elicit a response from a user. Therefore an invitational content item and a media item can be distinct item types, each of which can be presented in a media station.

In some embodiments, the invitational content can be used as a source of revenue and/or to subsidize a media station so that the media items can be provided to end users free of charge or for a reduced fee. The invitational content can be presented within a media station using a variety of techniques. In some cases, invitational content can be presented to a user in a manner that prevents or blocks the playback of a next media item or a next segment of a media item. For example, upon the completion of the playback of a music item, but before beginning playback of a new music item, an invitational content item can be presented in the media stream. Invitational content can also be displayed in conjunction with a media item or media item representation. For example, an invitational content item can be presented in a banner ad displayed with a music album cover or during the playback of a television show.

Further, in some embodiments, the invitational content can include an interactive segment that can be presented concurrently with one or more media items. The interactive segment can be configured such that a user can interact with the invitational content without disrupting playback of media items being presented concurrently. A user can thus interact with various features and views of the interactive segment during the playback of a media item without disrupting the media item. For example, in some embodiments, the interactive segment can be a rich media advertisement that includes various views and screens which a user can navigate through while listening to an audio media item.

A downside to presenting both invitational content and media items, either simultaneously or sequentially, when the invitational content is not related to the media items is that a user may equate the media item with the invitational content. For example, a user may think that an invitational content provider endorses a particular media item, or that a media item provider has authorized the use of the media item to promote an offering associated with the invitational content. To decrease the potential for confusion, the media station can also include bumper content, which can be presented concurrently with the interactive invitational content, but just prior to resuming playback of a media item.

A bumper content item can be an intermediary content item that is used to transition from invitational content to a media item, thereby creating user awareness that the media item is not related to an item of invitational content that the user may also be experiencing. For example, a bumper content item can be an audio message such as "now back to the music" that is used to transition between invitational content to an audio media item. Thus a user that is interacting with the interactive segment of an item of invitational content will be made aware that the upcoming media item is not related to the item of invitational content, even though the user is experiencing both concurrently.

To facilitate providing a media station to be performed by a client device 105, multiple computing devices can be connected to a communication network 110 and configured to communicate with each other through use of the communication network 110. The communication network 110 can be any type of network, including a local area network ("LAN"), such as an intranet, a wide area network ("WAN"), such as the internet, or any combination thereof. Further, the communication network 110 can be a public network, a private network, or a combination thereof. The communication network can also be implemented using any type or types of physical media, including wired communication paths and wireless communication paths associated with one or more service providers. Additionally, the communication network 110 can be configured to support the transmission of messages formatted using a variety of protocols.

A client device 105 can be any type of general computing device capable of network communication with other computing devices. For example, the client device 105 can be a personal computing device such as a desktop or workstation, a business server, or a portable computing device, such as a laptop, smart phone, or tablet personal computer. The client device can include some or all of the features, components, and peripherals of computing device 500 of FIG. 5.

To facilitate communication with other client devices, the client device 105 can also include a communication interface configured to receive a communication, such as a request, data, etc., from another computing device in network communication with the client device 105 and pass the communication along to an appropriate module running on the client device 105. The communication interface can also be configured to send a communication to another computing device in network communication with the client device 105.

As illustrated, a client device 105 can be configured to communicate with a media station server 125 to perform a media station on the client device 105. For example, a media player application 115 running on the client device 105 can be configured to communicate with a media station module 130 on the media station server 125 to request, receive and perform a media station. A media station player can be any application capable of media item playback, such as a component of a webpage, a plug-in, a client-side application, etc.

The media station module 130 can be configured to create a media station to be performed on a client device. For example, the media station module 130 can be configured to assemble the media station by selecting media items, invitational content items and bumper items to be performed on the client device in a specified order. For example, the media station server 125 can include a media item database 135, a bumper content database 145 and an invitational content database 150, each configured to store multiple media items, bumper content items, and invitational content items respectively. The media station module 130 can be configured to communicate with the databases to select media items, bumper content items and invitational content to be performed as part of the media station.

Although the media item database 135, bumper content database 145 and the invitational content database 150 are illustrated separately, this is just one possible embodiment and is not meant to be limiting. In some embodiments, the databases can be combined as one database or any other possible combination.

Alternatively, in some embodiments, the multiple databases can be hosted on separate computing devices and the media station module 130 can be configured to communicate with the various computing devices to assemble the media station. For example, in some embodiments, the system can include an invitational content server 170 in network communication with the media station server 125 and the media station module 130 can be configured to communicate with the invitational content server 170 to request invitational content to be included in the media station. In some embodiments, the invitational content server 170 can transmit the invitational content to the media station server 125 where it can be assembled into the media station. In some embodiments, the invitational content server 170 can transmit the invitational content directly to the client device 105.

In some embodiments, the media station module 130 can be configured to transmit the assembled media station to the client device 105 where it can be performed by the media player application 115. For example, the media station module 130 can be in continuous communication with the media player application 115 to transmit the media station to be performed by the media player application 115.

In some embodiments, the media station module 130 can be configured to transmit the media station to the client device 105 in segments. For example, the media station module 130 can be configured to communicate with the client device to transmit an assembled segment of the media station which can be stored on the client device 105 and performed by the media player application 115. For example, the client device 105 can include a media station database 120 configured to store the received media station and the media player application 115 can be configured to communicate with the media station database 120 to retrieve the stored media station. In this type embodiment, the media station module 130 can be configured to periodically update the client device 105 by transmitting further assembled segments of the media station.

In some embodiments, the media station can be assembled at the client device 105 rather than at the media station server 125. For example, the media station module 130 can be running on the client device 105 and can be configured to request media items, bumper content items and invitational content from the media station server 125, or any other computing device. The received media items, bumper content items and invitational content can be stored in the media station database 120 and the media station module 130 can be configured to communicate with the media station database 120 to retrieve the stored media items, bumper content items and invitational content to assemble the media station. In this type of embodiment, the media station module 130 running on the client device 105 can be configured to periodically request further media items, bumper content items and invitational content be delivered to the client device.

The media station module 130 can be configured to assemble the media station based upon media station assembly rules. The media station assembly rules can dictate which media items, invitational content items and bumper content items should be selected for the media station as well as the sequential order in which they should be presented by the media player application 115.

In some embodiments, the media station server 125 can include a user profile database 165. The user profile database 165 can, at least in part, be constructed based on declared user characteristics related to one or more users. In some cases, the user profile database 165 may contain inferred or derived user characteristic values. The user profile database 165 can be configured to add additional profile data, update profile data, fill in missing profile data, or infer user characteristic values from declared data. In some cases, a user profile can contain demographic information about a user, such as age, gender, languages spoken, occupation, income, and other information. In some cases, a user profile can contain geographic and location information about the user, either broadly or in granular detail. Location information may contain current or reasonably current location according to a user's current global positioning, or may be information previously known about or provided by the user.

In some embodiments, the media station server 125 can include a segment database 175 that is used to aid in directing stations to users in a targeted fashion. The segment database 175 can store defined segments and associations between the segments and users, invitational content that should be targeted to users associated with the segments, and media content that should be targeted to users associated with the segments. A targeted station can be defined based on one or more user characteristics or derivatives thereof, and can be associated with one or more items of invitational content. Additionally, a targeted segment can be associated with one or more users. In some embodiments, the media station server 125 can update the segment database 175 to add newly defined targeted segments or to delete targeted segments.

In some cases, a user profile can be as simple as a single user characteristic identifier and a single user characteristic value. For example, the common demographic identifiers of gender, age, occupation, or income can each be used in establishing a user profile. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Furthermore, targeted segments can correspond to one or more segments that content providers are likely to easily understand and thus can quickly identify as being relevant to their content. Additionally, in some embodiments, content providers can define a custom targeted segment.

In some embodiments, a user profile within the user profile database 165 can contain media preferences that a user has expressed. For example, a user profile can include information that a user's genre preference is jazz. A targeted segment can also be defined to target a user's media preferences. For example, a targeted segment may include females, age 30, with a preference in jazz. A targeted station can be defined based on user's media preferences.

In some embodiments, the media station server 125 can include the metrics module 180. The metrics module 180 can be configured to communicate with the client device 105 in order to detect and analyze user interactions with the media items, invitational content and bumper content. A user interaction results when a user interacts with content through the client device 105. A user interaction can be further defined to include affirmative acts by the user as well as passive acts or the absence of an affirmative act. A user interaction can be weighted positively or negatively depending on various factors. In some embodiments, the metrics module 180 contains a set of rules that weight user interactions positively or negatively with respect to the media and invitational content the user is interacting with. In some instances, the set of rules may be customized to add weighted user interactions, remove weighted user interactions, and adjust weights of user interactions. The purpose of the metrics module 180 is to detect user interactions and weight them according to these rules. In some aspects of the present technology, the metrics module 180 factors in user profile data from the user profile database 165, and gives weights to demographic data, geographic data, media preference and other information from user profiles.

According to one aspect of the present technology, a methodology can be provided for ranking stations to be presented to a user according to user profile information as well as positive and negative interactions with the user's device and a navigation interface. Once the user interactions are weighted, the station ranking module 185 can proceed to give rankings to media stations according to rules that factor in a user's profile information and weighted interactions. In the user interface that is displayed on the client device 105, a featured stations bar is initialized. In some embodiments, the featured stations bar includes a number of slots, which represent a different set of media stations which may potentially be displayed to the user. Each slot contains an ordered queue, or bank, of media stations that correspond to the slot. The first media station queued is presented to the user as the front-facing media station for that slot. Each bank contains its own set of targeting definitions and targeting rules which determine the order of media stations within the queue. The queue order of each media station is determined by the station ranking module 185.

In one aspect of the present technology, the station ranking module 185 communicates with the metrics module 180 to access the weighting that the metrics module 180 has given to various user interactions that relate to media stations. The stations ranking module 185 then follows rules that factor in these weighted user interactions to determine the queue order of each media station within a given slot. In some embodiments, the station ranking module 185 factors in weightings of user profile data from the metrics module 180.

In one aspect of the present technology, the screen time module 190 is configured to calculate the screen time, or time to live, of media stations to be displayed on a user's screen. Once the ranking of media stations is determined by the stations ranking module 185, then the highest ranked media station is presented to the user in the front-facing slot. The highest ranked station will only appear for a given amount of time before the next station in the ranking is displayed in its place. The screen time module 190 determines the screen time of each media station according to a set of rules that factor in user interactions and media preferences.

Now that some basic concepts have been set forth, the present disclosure turns to a more detailed description of the present technology. As discussed above, the present technology is directed to systems and methods for presenting and suggesting media stations to users of an online media service based on users' media preferences and device interaction. The following figures provide exemplary systems and methods for practicing the present technology.

Figure 2:
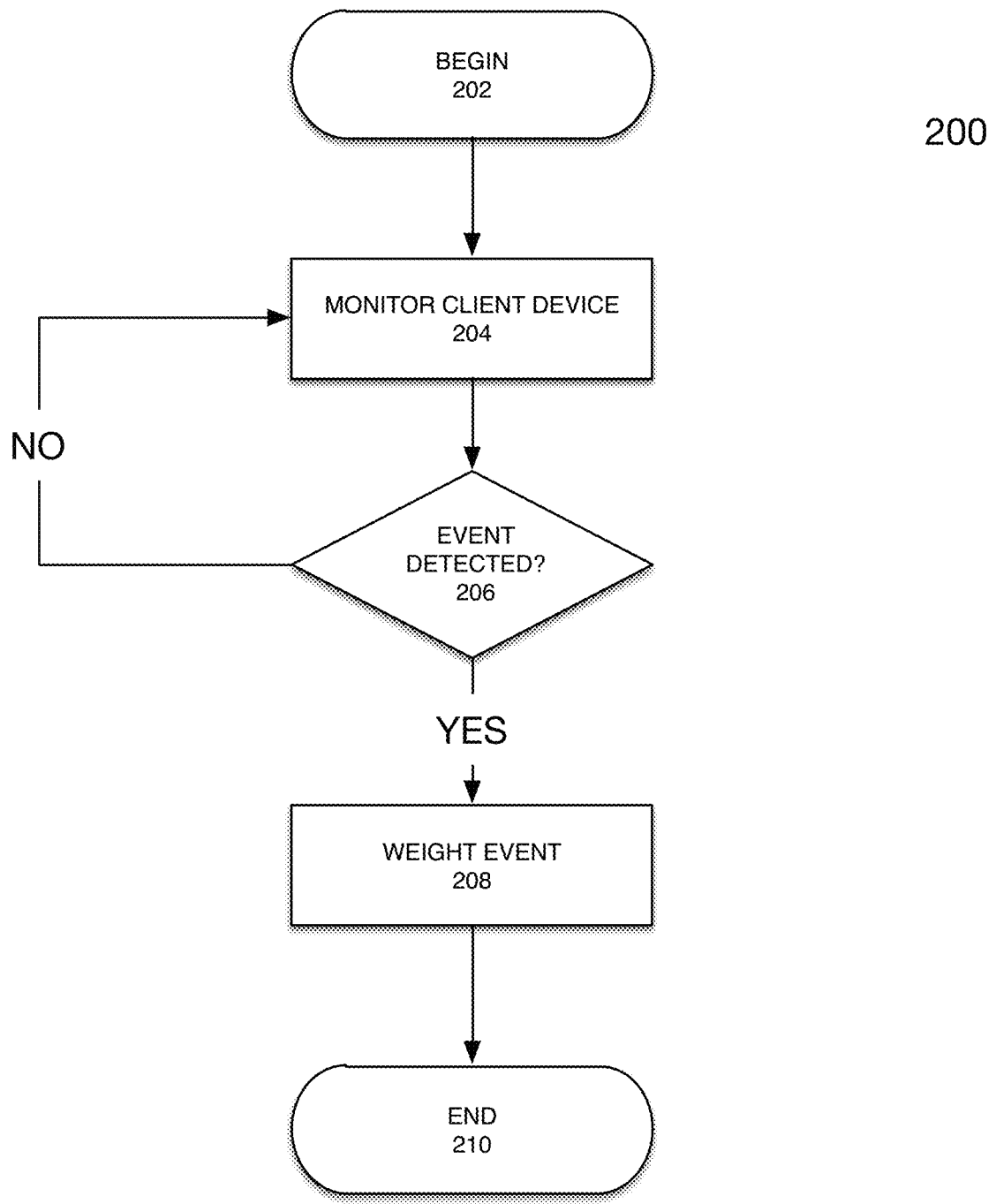
FIG. 2 illustrates an exemplary method embodiment.

Turning now to FIG. 2, an operation of the user interaction metrics process will be discussed in greater detail. FIG. 2 is a flowchart of steps in an exemplary method 200 for detecting and weighting user interactions from a client device. Method 200 begins at step 202 and continues to step 204. At step 204, the metrics module 180 commences monitoring the client device 105 for any number of user events.

A user event can be any interaction with respect to the client device 105 interfacing with a user interface for the media server. A user interaction can be further defined to include affirmative acts by the user as well as passive acts or the absence of an affirmative act. In one example, the metrics module 180 observes that the client device 105 has launched a music playing application, such as ITUNES RADIO maintained by Apple Inc. of Cupertino, Calif. Launching such an application would qualify as an event because this is a user interaction. Furthermore, as the device user utilizes the music playing application on the client device 105, the metrics module 180 can take notice of events including, but not limited to, changing the radio station, skipping a song, purchasing a song, rating a song, rating an artist, creating playlists, sharing radio stations, and creating new radio stations. All of these actions can be defined as events. Additional examples of events include user interactions with features that allow a user to customize a particular radio station by selecting options such as "Never Play This" or "Play More Like This." The server can also monitor for events on the client device 105 to determine if the application has been paused, shut down, or if it has been minimized such that it is running in the background while the device user performs other functions with the client device 105. In addition, user gestures, such as a swipe left or right in a trackpad or touch screen to see different featured stations, can be considered a user event.

Furthermore, as mentioned above, an event can also include a passive activity such as listening to the mobile user's favorite radio station. A favorite radio station can be explicitly defined in the application or it can be inferred based on the past usage patterns. Also, an event is defined to include listening to one of the mobile user's favorite songs, artists, or genres. Such favorites can be explicitly defined in the application, or can be inferred based on usage patterns such as having a low "skip" rate over a number of times played. An event also includes the absence of an affirmative act by the device user when one might normally be expected. For example, if the radio station is playing a song that the device user regularly skips, the lack of a "skip" command is classified as an event.

The metrics module 180 can monitor the client device 105 to detect the events in several different ways. For example, the client device 105 can maintain a localized history log of events that have occurred on the client device 105. This log can contain information such as the time/duration of the event, any application data associated with the vent, and a description of the event. The client device 105 can provide this information to the ad server in real-time, on a periodic basis, or upon request. Alternatively, each application that runs on the client device 105 can be responsible for maintaining its own event log. The client device 105 can collect the information from the applications for centralized management, or the application can report the activity to the ad server directly.

The metrics module 180 can also determine when a client device 105 can be classified as having an attentive or passive user mode. If very little time has elapsed since the last event, then the client device 105 can be classified as having an attentive user mode. As more time passes from the event, the classification can progressively change until it is determined that the client device 105 is being employed in a passive user mode. For example, if a user has only a minute between affirmative user events, then the metrics module 180 can classify the client device 105 as having an attentive user mode. If twenty minutes elapses between affirmative user events, the metrics module 180 can classify the client device 105 as having a passive user mode.

Referring back to FIG. 2, at step 206 it is determined whether or not an event was detected. If none has been detected, the method returns to step 204 and continues to monitor the client device 105. If an event is detected at step 206, the method 200 proceeds to step 208. At step 208, the metrics module 180 determines a weight for the event detected in 206, according to a provided set of rules.

The set of rules that the metrics module 180 uses for weighting events can be a standardized set of values to be assigned for each given event. Alternatively, the set of rules can be customized in any way possible to algorithmically or editorially determine a value or several values to assign to a given event. The set of rules applied to the weighting can be simple, or can be complex and involve a series of steps and calculations. A rule in the set can also factor in specific media stations that it applies or does not apply to. For example, a rule can specify that a user clicking away from a pop station should give a negative weight and low value to the user interaction with respect to other pop stations, and a positive weight and high value to the user interaction with respect to rock stations. In addition, whether a client device 105 has been classified as being in active or passive user mode for a given event can have an affect on the weight assigned to the event. Once the event has been weighted, the method continues to step 210 to resume previous processing, including repeating method 200.

From the foregoing, it becomes apparent that detecting and weighting user events with the client device 105 as the user engages with media content is an important process. The unique ways in which each user interacts with a media playback site offer insight into the preferences and interests of the user, and those interactions can be assigned values in a way that makes personalizing the presentation of media stations and media content to the individual user possible.

Figure 3:
FIG. 3 illustrates an exemplary method embodiment.

Now turning to FIG. 3, an operation of the station ranking process will be discussed in greater detail. FIG. 3 is a flowchart of steps in an exemplary method 300 for ranking media stations based on weighted user data.

At step 302, media station slots are initialized by the media station module 130. As described above, a featured navigation scheme presented to a client device 105 involves a number of media stations being presented to the user in a format optimized to take advantage of the client device's screen space. In one embodiment, the user is presented with a series of slots, each of which contains a bank of stations which are ordered in a sorted queue. Upon initialization, the banks of stations may not yet be in a properly sorted state. Initialization can involve sorting each bank of stations in a predefined or editorially curated fashion. Initialization can also involve using cached or predetermined data about the user, such as data from the user profile or from the content of the user's media library, in order to initially sort each bank of stations.

Slots can be sorted either in freeform ways, or in an editorially curated fashion. In some embodiments, individual slots can be directed to invitational content from invitational content providers, and can appear more prominently in the slot order. Slots featuring invitational content may also feature a pre-determined order of stations to be presented to the user.

At step 304, weighted user profile data can be received by the station ranking module 185. The user profile data is retrieved from either the user profile database 165 or the metrics module 180. As described above, user profile data can contain a wide range of data about a user. In some embodiments, user profile data can include demographic and geographic data. For example, a user may be male, aged 30, living in New York City. In some instances, the user profile data is further segmented into targeted ranges. For instance, the user may fit into the 24-32 age range that may be specified by an invitational content provider or by targeting rules within the station ranking module 185. In addition, the user profile data may contain media preferences of the user. For instance, a user may have a preference for jazz music. In some embodiments, the user profile data is retrieved from the user profile database 165 and has been pre-weighted. In other embodiments, the user profile data is retrieved from the metrics module 180 and has been weighted according to a set of targeting rules within the metrics module 180.

At step 306, weighted events, or weighted user interactions, are received from the metrics module 180. The weighted events can be the result of the weighting of user interactions that occurs in the process described in FIG. 2. Steps 304 and 306 can be performed sequentially, at the same time, or in a reverse order.

At step 308, rankings are assigned to the media stations within each slot that have been initialized in step 302. The values can be based on a combination of weighted events, user profile data, and additional algorithmic or editorial ranking specifications. A set of targeting rules within the station ranking module 185 govern how the weighted events, user profile data, and other considerations are factored into determining the rankings of media stations. Targeting rules may be a standardized set of rules, or may be customized in a number of ways.

For example, a station may be targeted toward males, in the age range of 19-24, and contain smooth jazz music. User A is a male, age 20, and his profile states a preference for jazz music, but his user interactions have suggested a preference for rock music. User B is a male, age 17, and his profile states a preference for rock music, but his user interactions have suggested a preference for jazz music. The targeted rules for station ranking in this example may be customized, and may be weighted in such a way that user interactions are much more important than user profile data. In such an instance, it's possible that User A may have this station placed further back in a queue than other stations, or it may not appear in a queue at all. This is because even though his user profile data suggests that he is a prime target for this station, his user interactions suggest that the station is not suited to his interaction and engagement history with the service. Conversely, even though User B's profile data suggests he is not a good fit for the station, his interactions and engagement with the service lead the station to appear first in his queue. The targeting rules may be adjusted to weight user profile data more than user interaction data, in which case the opposite result might occur.

In some embodiments, other levels of filtering may be factored in which can cause other highly ranked media stations to not be presented. For example, although a user might have a media station highly ranked, it may be pushed back in the ranking because of invitational content which is deemed to take priority. In another example, a highly ranked station may be pushed back in favor of a station for an independent music label, which may be presented to a user for music discovery.

Finally, at step 310, the ranked media stations can be ordered within the sorted queue of each slot. At this point, the presentation of ranked media stations is ready to be displayed to the client device 105, but in some embodiments, the screen time, or time to live, of the ranked media stations must be determined.

Figure 4:
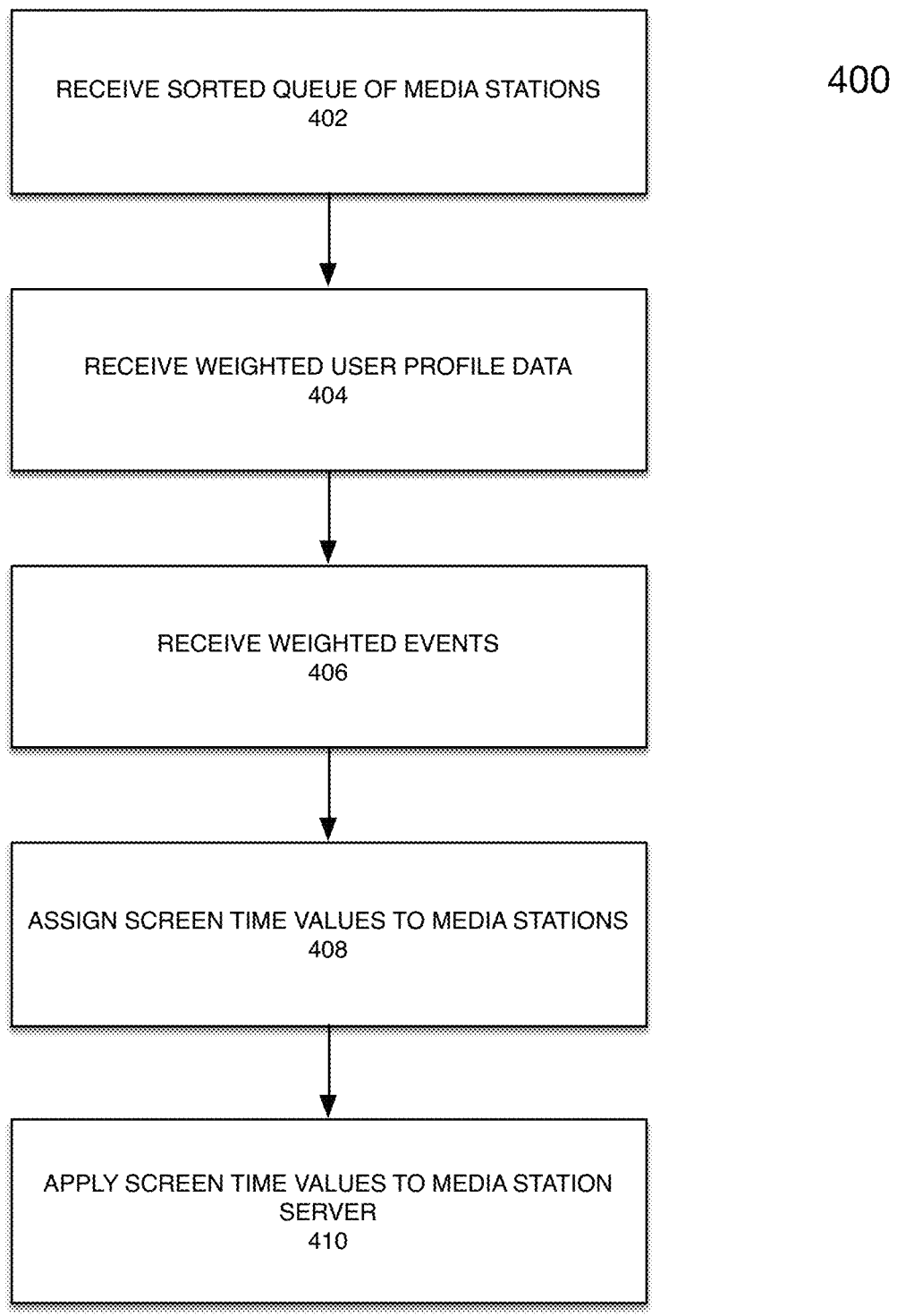
FIG. 4 illustrates an exemplary method embodiment.

Turning now to FIG. 4, an operation of the screen time determination process will be discussed in greater detail. FIG. 4 is a flowchart of steps in an exemplary method 400 for determining the amount of screen time each media station receives with respect to being displayed for a client device.

Method 400 beings at step 402, where a sorted queue of media stations is received by the screen time module 190. The sorted queue is received from the station ranking module 185 after the process of FIG. 3 is complete.

At step 404, weighted user profile data is received. The weighted user profile data is retrieved in the same fashion as in step 304 of FIG. 3. In some embodiments, the user profile data is retrieved from the user profile database 165 and has been pre-weighted. In other embodiments, the user profile data is retrieved from the metrics module 180 and has been weighted according to a set of targeting rules within the metrics module 180.

At step 406, weighted user events are received. The weighted events are retrieved from the metrics module 180 in the same fashion as in step 306 of FIG. 3. Steps 404 and 406 can be performed sequentially, at the same time, or in reverse order.

At step 408, screen time values are assigned by the screen time module 190 to individual media stations within the sorted queues. This provides a way for each slot to cycle through each of the ranked stations within the slot. As described above, each featured media station within a slot has a defined screen time, or time to live, after which the sequence of sorted stations is refreshed either with a new sorted order, or with each slot showcasing the next station from the sorted queue according to the ranking method described above.

A number of user actions and inputs can be considered that will decide how the media station lineup can be refreshed or whether the screen time can be shortened for displaying a new sequence. User actions to be considered are embodied in the weighted user events retrieved in step 406. In some embodiments, may include the user's overall engagement time with a media service, engagement time with a given station, or engaging time with stations having similar properties, such as the same genre of music. Another action may include the user's exposure of the featured station scheme in terms of impression time. Yet another action may include the user's gestures, including whether a user swipes left or right to see additional featured stations. User actions such as these have been weighted by the metrics module 180, as discussed above, according to targeted rules.

The screen time values are assigned based on a set of rules that apply to the screen time module 190. The rules may be standardized and predefined, or may be customized in any way.

An example of determining screen time duration follows. Suppose User C is a female, aged 30, with a preference for pop music. She has spent large amounts of passive time listening to a Top 40 Pop Charts station, and has often clicked away from stations that played rock music. Her interaction with stations that play jazz music has been inconsistent. In this instance, depending on the particular targeting rules set up for determining screen time duration, stations that are oriented toward pop music may appear at the front of User C's station slots in her navigation scheme for a long time. The screen time for the Top 40 Pop Charts station may be very high, and may even be determined to display indefinitely. The screen time for stations that play rock music may be determined to be very brief, or may not appear at all. The screen time for stations that play jazz music may be somewhere in the middle, and may depend on secondary factors. For example, stations that play jazz with a secondary genre of pop may have a longer screen time, while stations that play jazz with a secondary genre of rock may have a shorter screen time.

Returning to FIG. 4, at step 410, the screen time durations are applied to each of the corresponding media stations within the sorted queues. At this point, the user is presented with an optimized, individualized navigation scheme that includes a display of media stations tailored to the user's preferences and engagement with the media site. The process from FIG. 2 through FIG. 4 can repeat as the user continues to engage with the site, and the navigation scheme can periodically be refreshed with new slots, new sorted queues of media stations, and new screen times for media stations.

Figure 5B:
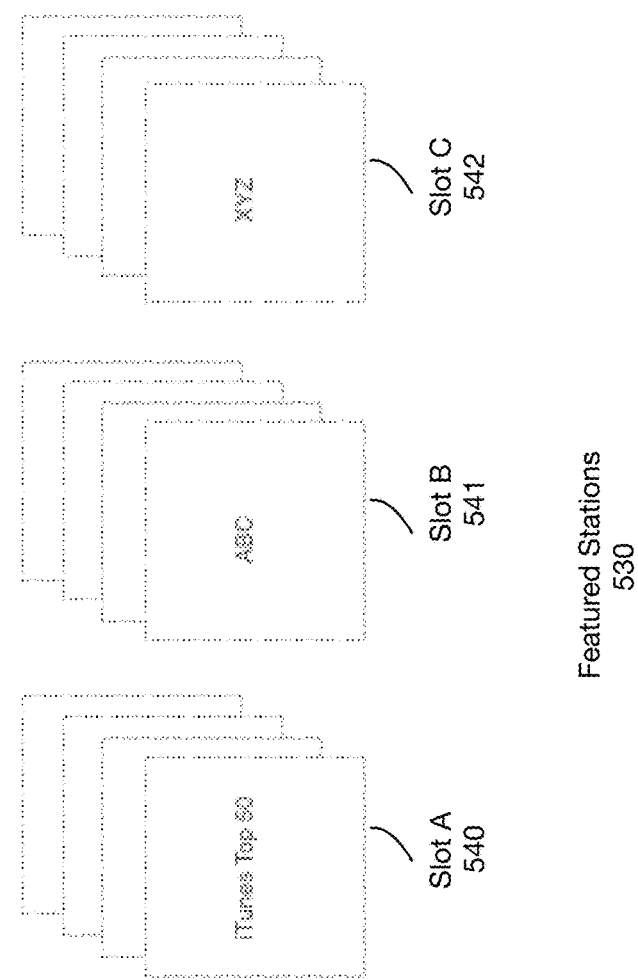
FIG. 5A and FIG. 5B illustrate exemplary embodiments of a station navigation scheme containing personalization elements.
Figure 5A:
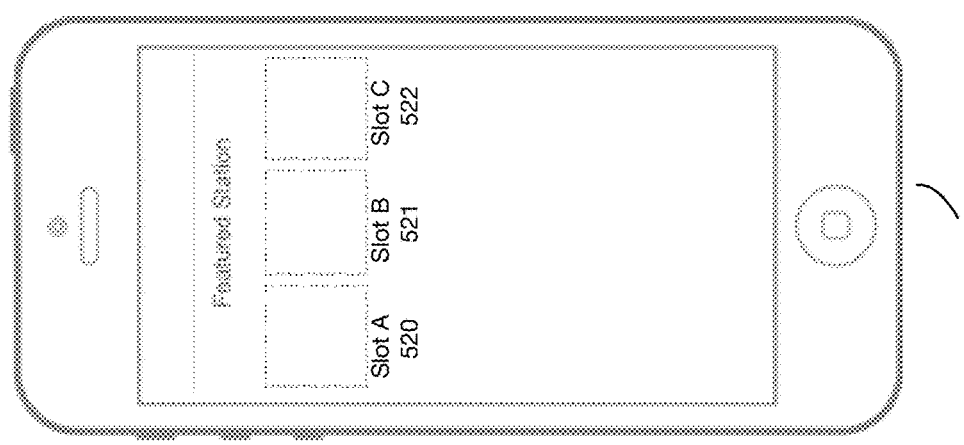

FIG. 5A, and FIG. 5B illustrate exemplary embodiments of a navigation scheme containing personalization elements. The more appropriate embodiment will be apparent to those of ordinary skill in the art when practicing the present technology. Persons of ordinary skill in the art will also readily appreciate that other system embodiments are possible.

FIG. 5A illustrates one possible embodiment of a navigation scheme with featured stations. Client device 510 is capable of presenting a navigation scheme for an online media service to a user. Upon launching the media service, the user sees a Featured Stations portion of the navigation scheme, and a My Stations portion of the navigation scheme. The My Stations portion may include selections of stations that the user has affirmatively chosen as favorite media stations. The Featured Stations portion contains stations that the navigation scheme has presented to the user in a personalized fashion. In this embodiment, the Featured Stations portion contains Slot A 520, Slot B 521, and Slot C 522. Different numbers of slots may be possible in different embodiments depending on the navigation scheme, client device, and user preferences. Other slots may also be available off-screen, and may be accessed via user gestures such as a left or right swipe. Each slot displays a single station that is presented to the user. For example, Slot A 520 may contain a pop music station, Slot B 521 may contain a Christmas seasonal station, and Slot C 522 may contain a station for a musical artist. Each slot also contains a bank of other stations in a sorted queue that are hidden to the user while the top station is showing. The bank of stations is sorted according to the screen ranking method, described above. The duration that each of the front-facing stations in the slots is shown is dependent upon the screen time determined for that station according to the screen time duration method, described above. Once the screen time for a station expires, the station is either moved to the back of the sorted queue, or eliminated from the queue. The next station in the queue becomes the new front-facing station that is presented to the user.

As a user interacts with the navigation scheme, the metrics module 180 detects user events, weights them according to targeting rules, and sends them to the station ranking module 185 and the screen time module 190, according to the user interaction methods described above.

FIG. 5B illustrates an embodiment of a possible navigation scheme similar to FIG. 5A, but with the banks of stations shown for each slot. The featured stations 530 are presented to the user in the form of several slots within the navigation scheme. The slots include Slot A 540, Slot B 541, and Slot C 542. As described above, each slot contains a bank of stations in a sorted queue. The ranking of the stations within the sorted queue is determined by the station ranking module 185. The screen time duration for each front-facing station is determined by the screen time module 190. As in the embodiment of FIG. 5A, as the screen time of a front-facing station expires, that station is either moved to the back of the sorted queue, or is removed from the queue. The next station in the queue becomes the new front-facing station presented to the user. A user may also interact with the navigation scheme in various ways. User interactions and events are detected by the metrics module 180, which weights them according to targeting rules and sends them to the station ranking module 185 and the screen time module 190.

Figure 6A:
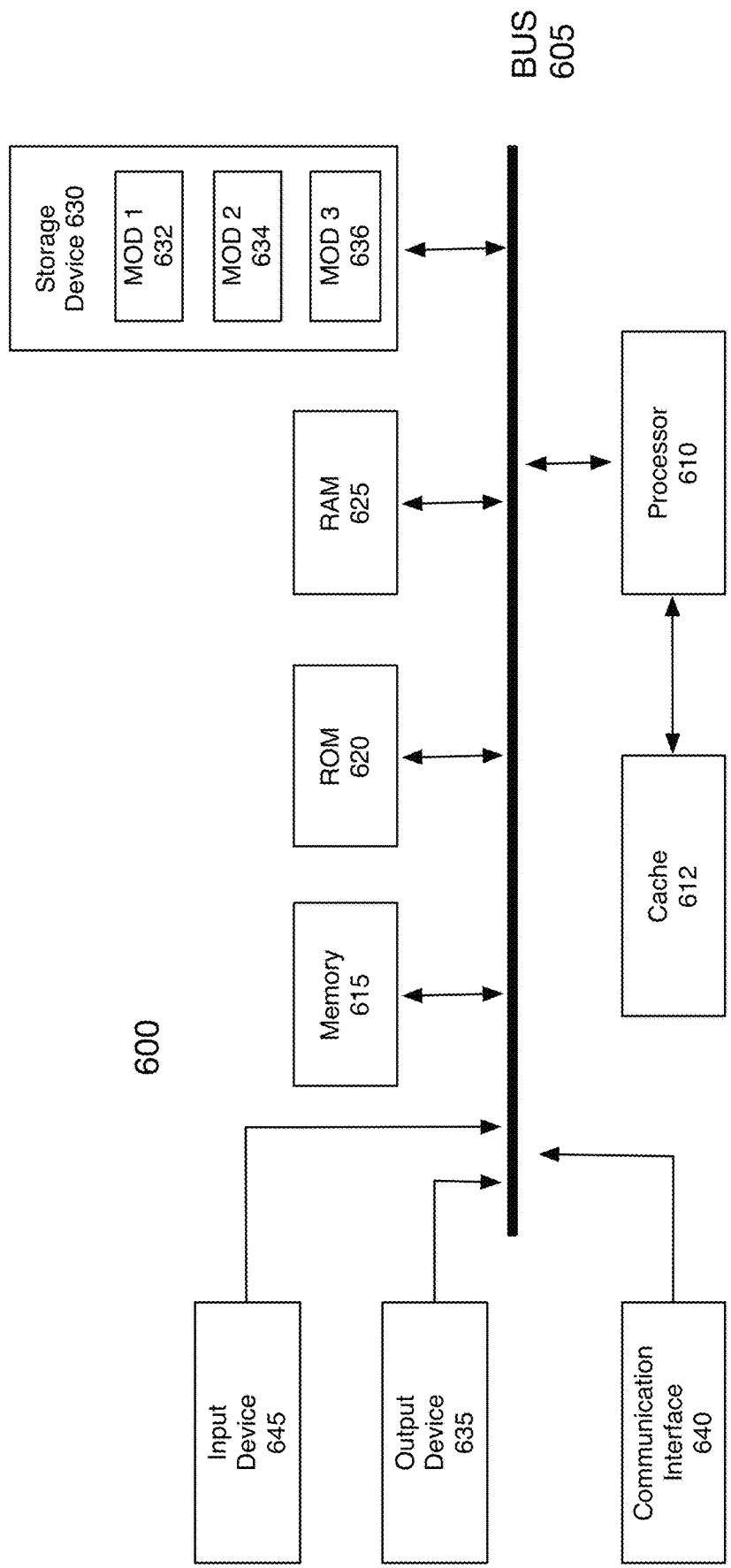
FIG. 6A and FIG. 6B illustrate exemplary system embodiments.
Figure 6B:
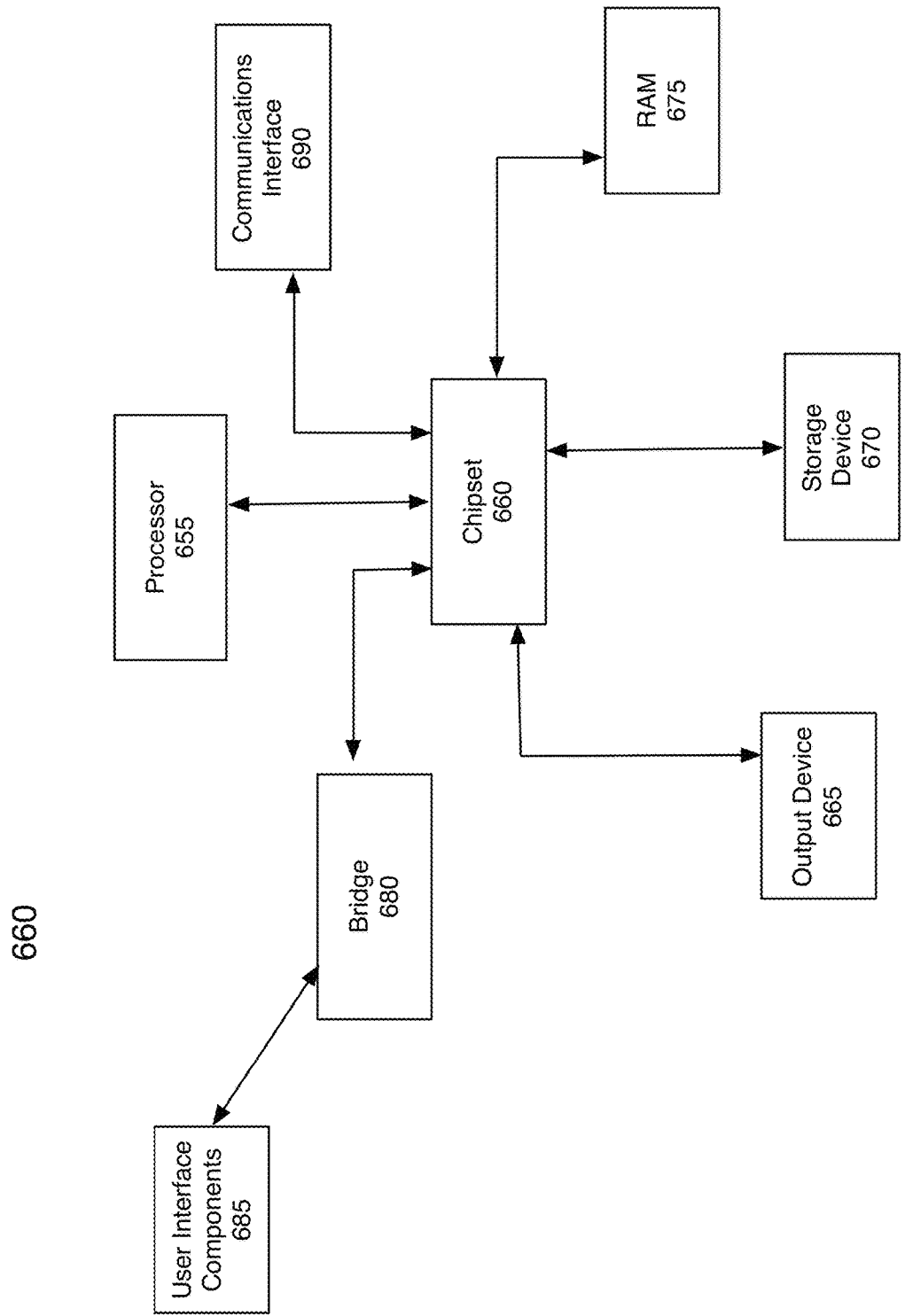

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 500, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method comprising:
providing an online media player to a client device, wherein the online media player includes a plurality of slots and a plurality of media station queues, each slot associated with a category of media content;
monitoring usage of the online media player to detect one or more user interactions with the online media player;
based on the one or more detected user interactions, determining one or more user media preferences;
ranking media stations in a queue of the plurality of media station queues based on the one or more user media preferences;
determining an amount of screen time for presenting a media station in a slot of the plurality of slots based on the ranking of the media stations via the online media player; and
based on the one or more user media preferences and the category, selecting the media station from the queue to present for the amount of screen time, via the online media player, in the slot of the plurality of slots.

2. The method of claim 1, wherein the one or more user interactions comprises at least one of a playback selection of a media item, a playback skip request associated with the media item, or a user input indicating a user interest in the media item.

3. The method of claim 2, wherein the media item comprises at least one of a song or a music station, and wherein the user input indicating the user interest in the media item comprises one of a like of the media item or a dislike of the media item.

4. The method of claim 1, wherein the online media player is configured to provide a respective queue of one or more media items per each slot of the plurality of slots, wherein the respective queue of the one or more media items comprises at least one of a respective queue of media stations or a respective queue of songs.

5. The method of claim 1, further comprising determining a media player navigation scheme for presenting the media station from the in the slot according to a particular layout, wherein at least one of the plurality of media stations in an associated slot or the particular layout is determined based on the one or more user interactions.

6. The method of claim 1, further comprising:
generating, based on the one or more user media preferences, the queue including one or more media items selected for playback and presentation through the online media player for the amount of screen time.

7. The method of claim 1, further comprising:
based on the one or more user interactions, determining an ordering of media items in a respective queue based on the ranking.

8. The method of claim 1, further comprising:
determining a second amount of screen time for presenting a second media station in a second slot via the online media player and selecting the second media station to present via the online media player in the second slot of the plurality of slots for the second amount of screen time.

9. The method of claim 1, the method further comprising:
displaying the media station in the slot for the amount of screen time; and
after the amount of screen time has elapsed, displaying a subsequent media station in the slot that has been selected from the queue.

10. The method of claim 1, the method further comprising:
based on an amount of time that has elapsed between the one or more user interactions, determining a mode of the client device, wherein the mode is a passive mode or an attentive mode; and
based on the mode being the passive mode, increasing a presentation time for the media station presented in the slot.

11. A system comprising:
one or more processors; and
at least one computer-readable storage medium having stored therein instructions which, when executed by the one or more processors, cause the one or more processors to:
monitor usage of an online media player associated with a client device, to detect one or more user interactions with the online media player, wherein the online media player includes a plurality of slots and a plurality of media station queues, each slot associated with a category of media content;
based on the one or more detected user interactions, determine one or more user media preferences;
rank media stations in a queue of the plurality of media station queues based on the one or more user media preferences;
determine an amount of screen time for presenting a media station in a slot of the plurality of slots based on the ranking of the media stations via the online media player; and
based on the one or more user media preferences and the category, select the media station from the queue to present for the amount of screen time via the online media player in the slot of the plurality of slots.

12. The system of claim 11, wherein the one or more user interactions comprises at least one of a playback selection of a media item, a playback skip request associated with the media item, or a user input indicating a user interest in the media item.

13. The system of claim 12, wherein the media item comprises at least one of a song or a music station, and wherein the user input indicating the user interest in the media item comprises one of a like of the media item or a dislike of the media item.

14. The system of claim 12, wherein the online media player is configured to provide a respective queue of one or more media items per each slot of the plurality of slots, wherein the respective queue of the one or more media items comprises at least one of a respective queue of media stations or a respective queue of songs.

15. The system of claim 11, the at least one computer-readable storage medium having stored therein additional instructions which, when executed by the one or more processors, cause the one or more processors to:
determine a media player navigation scheme for presenting the media station from the queue the slot according to a particular layout, wherein at least one of the plurality of media stations in an associated slot or the particular layout is determined based on the one or more user interactions.

16. The system of claim 11, the at least one computer-readable storage medium having stored therein additional instructions which, when executed by the one or more processors, cause the one or more processors to:
based on the one or more user interactions, determine an ordering of media items in the queue based on the ranking.

17. The system of claim 11, the at least one computer-readable storage medium having stored therein additional instructions which, when executed by the one or more processors, cause the one or more processors to:
determine a second amount of screen time for presenting a second media station in a second slot via the online media player and selecting the second media station to present via the online media player in the second slot of the plurality of slots for the second amount of screen time.

18. A non-transitory computer-readable storage medium comprising:
instructions which, when executed by the one or more processors, cause the one or more processors to:
monitor usage of an online media player associated with a client device, to detect one or more user interactions with the online media player, wherein the online media player includes a plurality of slots and a plurality of media station queues, each slot associated with a category of media content;
based on the one or more detected user interactions, determine one or more user media preferences;
rank media stations in a queue of the plurality of media station queues based on the one or more user media preferences;
determine an amount of screen time for presenting a media station in a slot of the plurality of slots based on the ranking of the media stations; and
based on the one or more user media preferences and the category, select the media station from the queue to present for the amount of screen time via the online media player in the slot of the plurality of slots.

19. The non-transitory computer-readable storage medium of claim 18, wherein the one or more user interactions comprises at least one of a playback selection of a media item, a playback skip request associated with the media item, or a user input indicating a user interest in the media item.

20. The non-transitory computer-readable storage medium of claim 18, storing additional instructions which, when executed by the one or more processors, cause the one or more processors to:
- determine a media player navigation scheme for presenting the media station from the queue in the slot according to a particular layout, wherein at least one of the plurality of media stations in an associated slot or the particular layout is determined based on the one or more user interactions.

21. The non-transitory computer-readable storage medium of claim 18, storing additional instructions which, when executed by the one or more processors, cause the one or more processors to:
- generate, based on the one or more user media preferences, the queue including one or more media items selected for playback and presentation through the online media player for the amount of screen time; and
- based on the one or more user interactions, determine an ordering of media items in the queue based on the ranking.

* * * * *